United States Patent [19]

Massano

[11] Patent Number: 5,766,651
[45] Date of Patent: Jun. 16, 1998

[54] EQUIPMENT FOR THE INJECTION-MOULDING OF CONTAINERS OR PARISONS FOR CONTAINERS OF PLASTICS MATERIAL

[75] Inventor: Modesto Enrico Massano, Mathi, Italy

[73] Assignee: Plasthing S.A.S. Di Modesto Massano E.C., Torino, Italy

[21] Appl. No.: 794,019

[22] Filed: Feb. 3, 1997

Related U.S. Application Data

[63] Continuation of Ser. No. 479,979, Jun. 7, 1995, abandoned.

[30] Foreign Application Priority Data

Dec. 9, 1994 [EP] European Pat. Off. ............ 94830572

[51] Int. Cl.⁶ .................................................... B29C 45/16
[52] U.S. Cl. .................. 425/130; 264/297.8; 264/328.8; 425/572; 425/588
[58] Field of Search ............................... 425/130, 523, 425/533, 572, 588; 264/297.8, 328.8

[56] References Cited

U.S. PATENT DOCUMENTS 3,482,284  12/1969  Rees .
3,947,176  3/1976   Rainville .
4,047,873  9/1977   Farrell .
4,744,742  5/1988   Aoki ........................................ 425/523
4,885,121  12/1989  Patel ........................................ 425/130

FOREIGN PATENT DOCUMENTS 2390267   12/1978  France .
2538297   6/1984   France .
55-37335  3/1980   Japan .
61-185417 8/1986   Japan .

Primary Examiner—Tim Heitbrink
Attorney, Agent, or Firm—Sughrue, Mion, Zinn, Macpeak & Seas, PLLC

[57] ABSTRACT

The equipment is for the moulding of plastics containers made of two different materials, particularly for the production of parisons for PET bottles comprising an inner portion of virgin PET and an outer portion of recycled PET. The equipment comprises a die plate having rotatable supports each carrying a pair of cores or male elements which are thus associated alternately with matrices of two different types so as to produce the inner portions and the outer portions of the parisons in two successive moulding steps.

19 Claims, 9 Drawing Sheets

EQUIPMENT FOR THE INJECTION-MOULDING OF CONTAINERS OR PARISONS FOR CONTAINERS OF PLASTICS MATERIAL

This is a Continuation of application Ser. No. 08/479,979 filed on Jun. 7, 1995 now abandoned.

BACKGROUND OF THE INVENTION

The present invention relates in general to equipment for the injection-moulding of plastics containers or parisons for containers produced by blow-moulding. More specifically, the present invention relates to equipment for moulding parisons for the manufacture of containers with the use of two different types of plastics material.

As is known, nowadays, most plastics bottles for foodstuffs used, for example, for the distribution and sale of liquids such as mineral waters and other drinks, are made of a plastics material known as polyethylene terephthalate, commonly known in short as PET. These PET bottles have become very widespread during recent years and the annual consumption can now be measured in thousands of millions of units.

These bottles are manufactured by a process which is commonly known as blow-moulding. More specifically, in order to produce a PET bottle, it is necessary first to manufacture a parison of this material. The parison has essentially the shape of a test-tube of smaller dimensions than the finished bottle and having relatively thick walls. This parison is produced by a conventional injection-moulding operation widely known in the art.

The parison is heated and then expanded by the blowing operation which is also widely known in the art, to achieve the desired shape and size. Clearly, in the course of the blowing operation, the thickness of the walls decreases considerably as a result of expansion.

Typically, however, the region near the opening of the parison is left unchanged. In fact, this portion is intended to form the neck of the bottle and therefore has to have sufficient thickness to give it the necessary rigidity.

For this reason, this portion is moulded in its final shape during the moulding of the parison and is kept unchanged during the blow-moulding operation. Typically, this portion is threaded to allow the PET bottle to be closed by a screw cap.

Given the typical production volumes of these PET bottles, the equipment for the injection moulding of the parisons uses dies with multiple cavities in order to achieve high productivity and thus to be economically competitive. Normally, this moulding equipment uses dies with 48 or 96 cavities.

The foregoing is widely known and does not therefore need to be detailed further. The present invention relates specifically to the injection-moulding of the parisons. The aspects which are characteristic of the invention will therefore be considered in detail below, whereas the aspects which remain unchanged in comparison with the prior art will be described briefly since they are generally within the competence of an expert in the art.

A serious problem connected with PET bottles is the need to use very pure plastics material, that is, PET. In fact, if this were not done any impurities present in the plastics material could contaminate the liquid foodstuffs in the PET bottles, altering their characteristics, particularly their organoleptic characteristics. It is therefore necessary to use new plastics material, commonly known as virgin material, to manufacture the parisons. This is clearly disadvantageous, since virgin PET is much more expensive than recycled PET. These PET bottles in fact represent a serious ecological problem since they are not normally re-used but, at the same time, they make available large quantities of recycled PET.

Moreover, it can be foreseen that, in the near future, the new regulations for the protection of the environment will make it obligatory to use at least a percentage of recycled plastics material in the manufacture of these PET bottles. The coming into force of a regulation of this type is already envisaged in California.

It is clear from the foregoing that there is an ever greater need to produce PET bottles with the use of at least some recycled material. As stated, up to now, this has not been possible, in order not to contaminate drinks and foodstuffs contained in PET bottles. However, only the internal surface of the bottle can cause contamination of its contents and is therefore required to be made of virgin PET. The remaining portion, on the other hand, can be made of recycled PET without this giving rise to problems of any kind.

Systems for manufacturing these PET bottles with the use of some virgin PET and some recycled PET have therefore recently been proposed. One of these systems will now be described with reference to FIGS. 1 to 4.

As stated above, the equipment for injection-moulding the parisons uses dies having large numbers of cavities so as to permit economically advantageous production volumes. For this reason, this equipment is of considerable size and cost and, typically, has two plasticator units, for example, of the screw plunger type.

Figure 1:
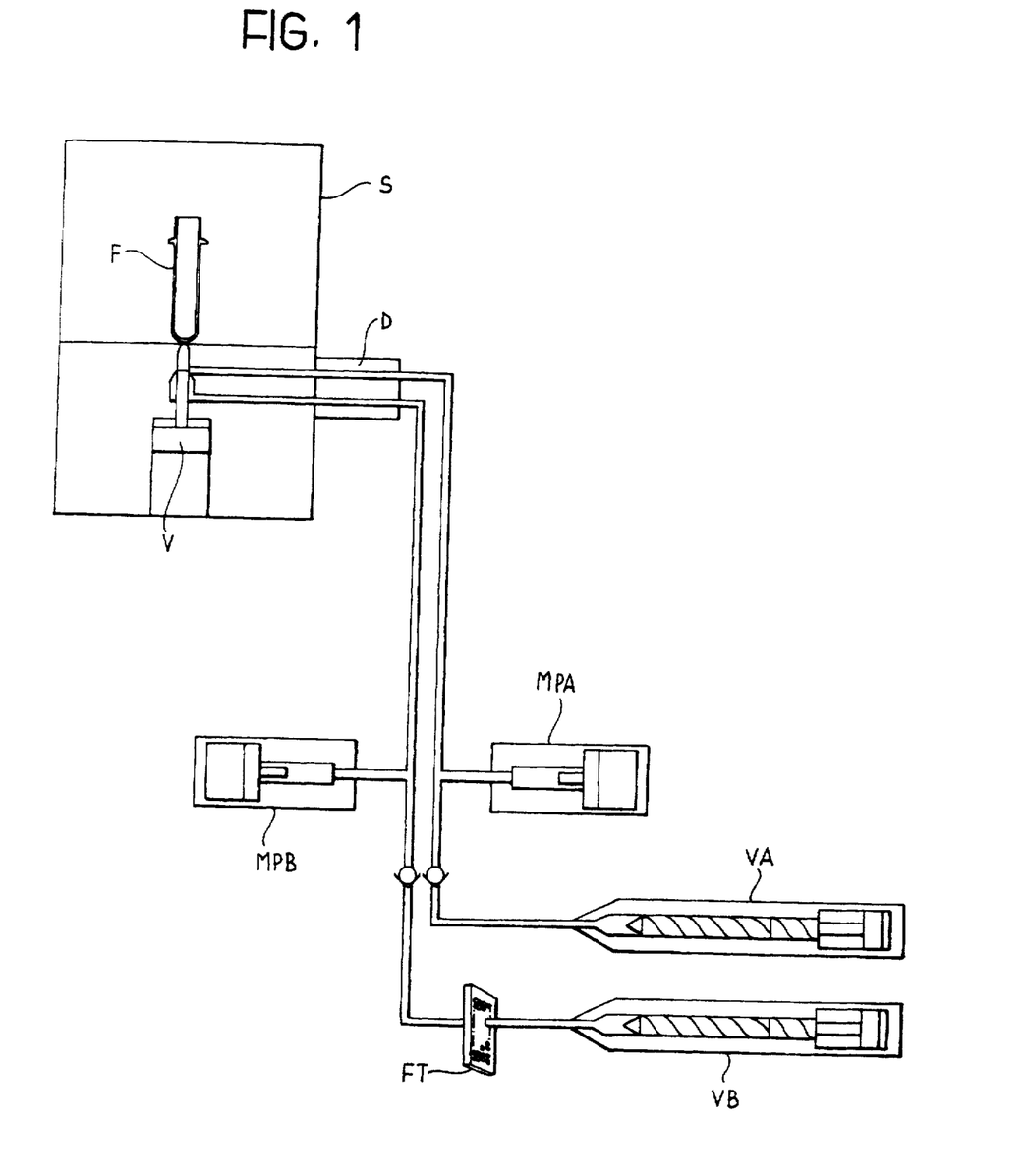
FIG. 1 shows schematically moulding equipment according to the prior art and has already been described.

FIG. 1 shows, schematically and not to scale, moulding equipment of this type formed for producing parisons partially of recycled PET. The equipment comprises two screw plasticator units VA and VB. The plasticator unit VA is supplied with virgin PET and the plasticator unit VB is supplied with recycled PET. For this reason, a filter FT is provided in the outlet duct of the plasticator unit VB to intercept any particles and impurities present in the recycled PET. Two metering pistons MPA and MPB are also provided in the ducts coming out of the two plasticator units VA and VB, respectively, for precisely controlling the quantity of material injected by each of the two plasticator units VA and VB.

The outlet ducts of the units VA and VB supply, through supply ducts D, the injectors which are intended to inject the plastics material into the cavities of a die S in order to manufacture the parisons F. For simplicity, a single injector and a single cavity in the die S are shown in the drawing. In the specific case, moreover, the injector comprises a valve V for controlling the type of plastics material injected. That is, the valve V can select the injection of virgin or recycled plastics material by opening one of the supply ducts of the injector and closing the other or vice versa.

With this equipment, it has been proposed to produce the parisons F by a moulding method which will now be described with reference to FIGS. 2 to 4. In these drawings, parisons F are shown schematically by sections taken in planes passing through their principal axes. Although, for simplicity, only the parisons F have been shown in the drawings, in fact, they also represent the cavities in the die S during the injection operation.

Figure 2:
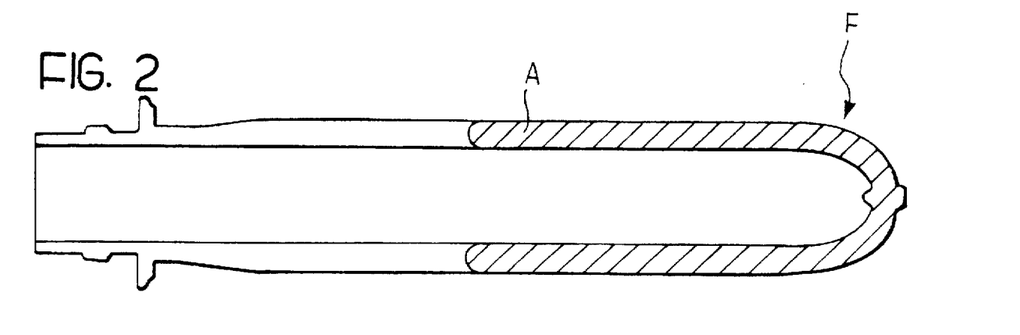
FIGS. 2 to 4 are schematic views, in section, showing the operation of the equipment of FIG. 1 and have already been described.

As can be seen, FIG. 2 shows a first stage of the injection operation in which virgin plastics material A is injected. The injection takes place from the end opposite the opening in the parison F and fills the cavity only partially.

Figure 3:
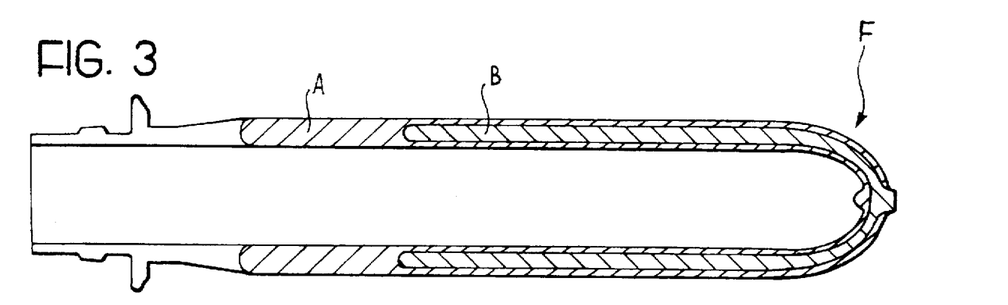

Recycled plastics material B is then injected, again by the same injector, as shown in FIG. 3. Owing to the skin effect, this recycled plastics material B does not contact the walls of the cavity, which are wetted by the virgin plastics material A, and the material B therefore penetrates the cavity of the parison F pushing some of the virgin plastics material A towards the opening in the parison F.

Figure 4:
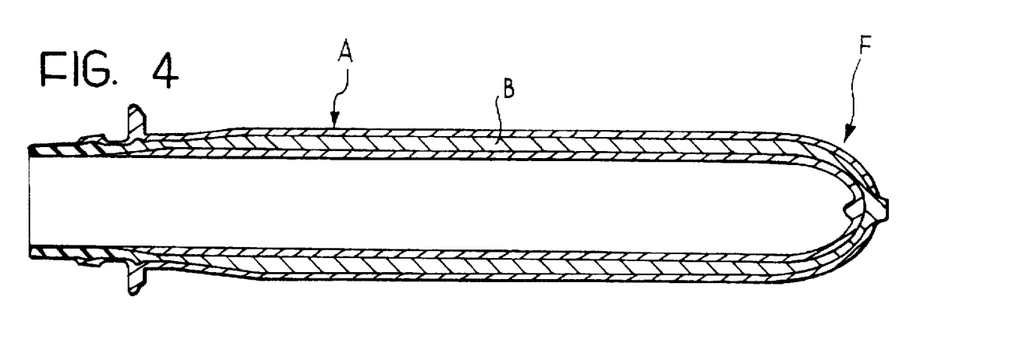

FIG. 4 shows the completed injection operation, in which the virgin plastics material A is distributed over the surfaces of the parison F whilst the recycled plastics material B remains in the interior.

The parison F is then removed from the die S in conventional manner and used as a conventional parison F.

This solution, however, has disadvantages due essentially to the fact that, during injection, the plastics material often does not follow the theoretical behaviour just described. In fact, during the injection operation, it is very easy for the recycled material B to come into contact with the surfaces of the cavity of the die S, thus rendering the result of the moulding operation unacceptable.

SUMMARY OF THE INVENTION

The object of the present invention is to provide injection moulding equipment which solves all the problems indicated above in a satisfactory manner.

According to the present invention, this object is achieved by virtue of injection-moulding equipment and a corresponding method having the characteristics indicated in the claims which follow the present description.

BRIEF DESCRIPTION OF THE INVENTION

Further advantages and characteristics of the present invention will become clear from the following detailed description, given with the aid of the appended drawings provided by way of non-limiting example, in which.

Figure 5:
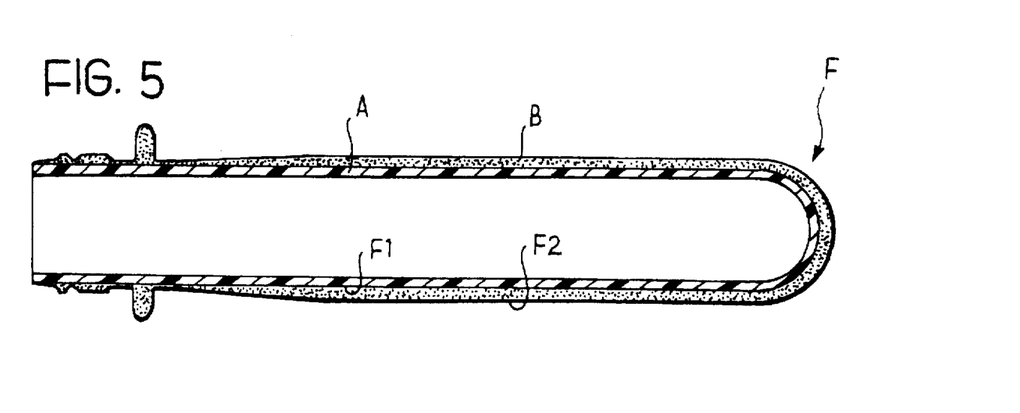
FIG. 5 is a schematic view, in section, of a parison produced by a equipment according to the present invention.

The present invention consists essentially of equipment for the manufacture of a container or parison comprising two portions of different plastics materials, for example, in the specific embodiment, a first portion of virgin plastics material and a second portion of recycled plastics material. A parison F produced by the equipment according to the invention, shown in FIG. 5, is constituted by a first, inner portion of virgin plastics material A and a second, outer portion of recycled plastics material B. Naturally, the two portions are joined inseparably so that the parison F is a single piece.

A parison F such as that shown mi FIG. 5 performs extremely well the task of permitting the use of a percentage of recycled plastics material and simultaneously ensuring an absolutely pure inner surface is in contact with the foodstuffs The equipment according to the present invention has in fact been developed and designed specifically for the manufacture of the aforementioned PET bottles. However, the invention can clearly be used advantageously whenever it is necessary to produce a container or a parison comprising essentially two portions, an inner portion and an outer portion, of different plastics materials.

The two portions, that is the inner portion A and the outer portion B, of the parison F of FIG. 5 are produced by means of the equipment according to the invention, by two separate injection-moulding steps. More specifically, in a first step, the inner portion A is moulded in virgin plastics material and the second, outer portion B of recycled plastics material is then moulded over the first, inner portion A in a second step. There is thus no risk that recycled material will reach the inner surface of the parison F, since the first moulding step enables with absolute certainty that the inner layer of the parison F is of virgin plastics material A. This safety, imparted by the production process, also enables the manufacture of parisons F having a considerable percentage of recycled plastics material B.

Preliminary tests carried out by the Applicant have ascertained that parisons F having a percentage of the order of 50% of recycled plastics material B can easily be manufactured. However, it is probably possible to produce parisons F having even greater percentages of recycled material B.

For convenience, the portion of virgin material A, that is, in practice, the parison after the first moulding step, will be indicated F1. The portion of recycled material B, and sometimes, by extension, the completed parison F, that is, after the second, over-moulding step, on the other hand, will be indicated F2. Similarly, both the virgin material and the first portion of the parison will be indicated A; a corresponding arrangement will apply to B.

It is widely known in the art to produce components having two different types of plastics material by over-moulding. If it is desired to produce a container or parison F of the type shown in FIG. 5, this is possible with the use of conventional moulding techniques. Dies having three distinct elements are normally used for injection-moulding concave objects having a shape of the aforementioned type. One of the elements, commonly known as the male element, is substantially cylindrical and rounded at the end and defines the inner surface of the parison F. The other two elements, which are fitted together, on the other hand, define the outer surface of the parison F.

These two elements, which are usually known as matrices, are separate from one another so that they can be moved apart, for example, by moving in directions perpendicular to the principal axis of the parison F, to permit the removal thereof. In fact, given the presence, on the neck of the bottle, of projections such as the thread for the cap or a flange (which is typically present on these bottles), it would be impossible to remove the parison F from the cavity which defines its outer surface if the two matrices could not be opened to release the parison F.

The removal of the male element which defines the inner surface of the parison F does not present problems, however, since the inner surface is typically formed without raised portions, undercuts or projections of other types and is smooth and of uniform or tapered (slightly conical) cross-section. The plastics material is typically injected from the end opposite the neck of the parison F in an axial position.

This technique for injection-moulding the parisons F is widely known to experts in the art.

In order to produce a parison F of the type shown in FIG. 5, the first portion F1 of the parison F can be moulded in the manner just described, that is, with the use of a male element and a pair of matrices which, when they are assembled, define in cooperation with one another, a cavity corresponding to the portion F1. The two matrices are then moved apart, thus releasing the first portion F1. At this point, the first portion F1 is inserted, without the male element being removed therefrom, between a second pair of matrices defining a cavity corresponding to the outer surface of the second portion F2, that is, of the finished parison F.

Once the male element, carrying the first portion F1, and the second pair of matrices have been fitted together, the over-moulding of the second portion F2, for example, of recycled material B, can take place. After this over-moulding step, the parison F is completed and can be removed in wholly conventional manner as if it were a parison F produced by a single injection moulding step.

The injection takes place in conventional manner, from the bottom end opposite the opening or neck of the parison F, in both the moulding step and the over-moulding step.

This system for manufacturing the parison F shown in FIG. 5 according to the prior art thus provides for the use of a single male element and two different pairs of matrices for producing the first portion F1 and the second portion F2. The male element therefore has to be translated or moved so as to be brought to one or other pair of matrices. Alternatively, of course, the pairs of matrices could be translated or moved to bring them to the male element.

This system of producing parisons F of the aforementioned type is the simplest and most convenient method according to the prior art and is within the capabilities of experts in the art.

However, although it is relatively easy to translate or move a single male element or a pair of matrices, the equipment currently used for the production of parisons for PET bottles use multiple matrices with 48 or 96 cavities. These are therefore machines of enormous dimensions, weight and complexity. Typically, this equipment has two plates, a first plate carrying the male elements, for example, 96 male elements, and a second plate carrying the pairs of matrices, for example, 96 pairs. Clearly, therefore, this equipment and the plates used thereby are very complex and difficult to produce.

The production of equipment of this type, which has two different plates of matrices and permits movement of male elements relative to a plate is a technical problem which is extremely difficult to solve. Even if it were possible to produce equipment of this type, it would certainly not be competitive because of its complexity and cost.

This problem is also further complicated by the fact that the die plates for both the male elements and the matrices require conditioning. In fact, ducts are provided in the plates for the forced circulation of liquid for heating and cooling the plates according to operational needs during the various stages of the moulding.

Typically, the plates carrying the male elements have only cooling circuits to enable the parisons F to be cooled after the injection step. The plates carrying the matrices, on the other hand, typically have heating systems so as to maintain the temperature of the ducts supplying the plastics material. In fact, since injection takes place from the bases of the parisons F, this means that it takes place from the portions of the plates carrying the matrices which, for this reason are provided with supply ducts for bringing the plastics material into the various cavities of the die.

Given the complexity and the dimensions of the plates, if it were possible to produce equipment having plates movable in the manner described it would therefore be extremely difficult and prohibitively expensive.

The equipment according to the present invention overcomes this problem, however, by the use of only two plates, as in conventional equipment, the plates being modified to permit the manufacture of the parisons F shown in FIG. 5.

Figure 6:
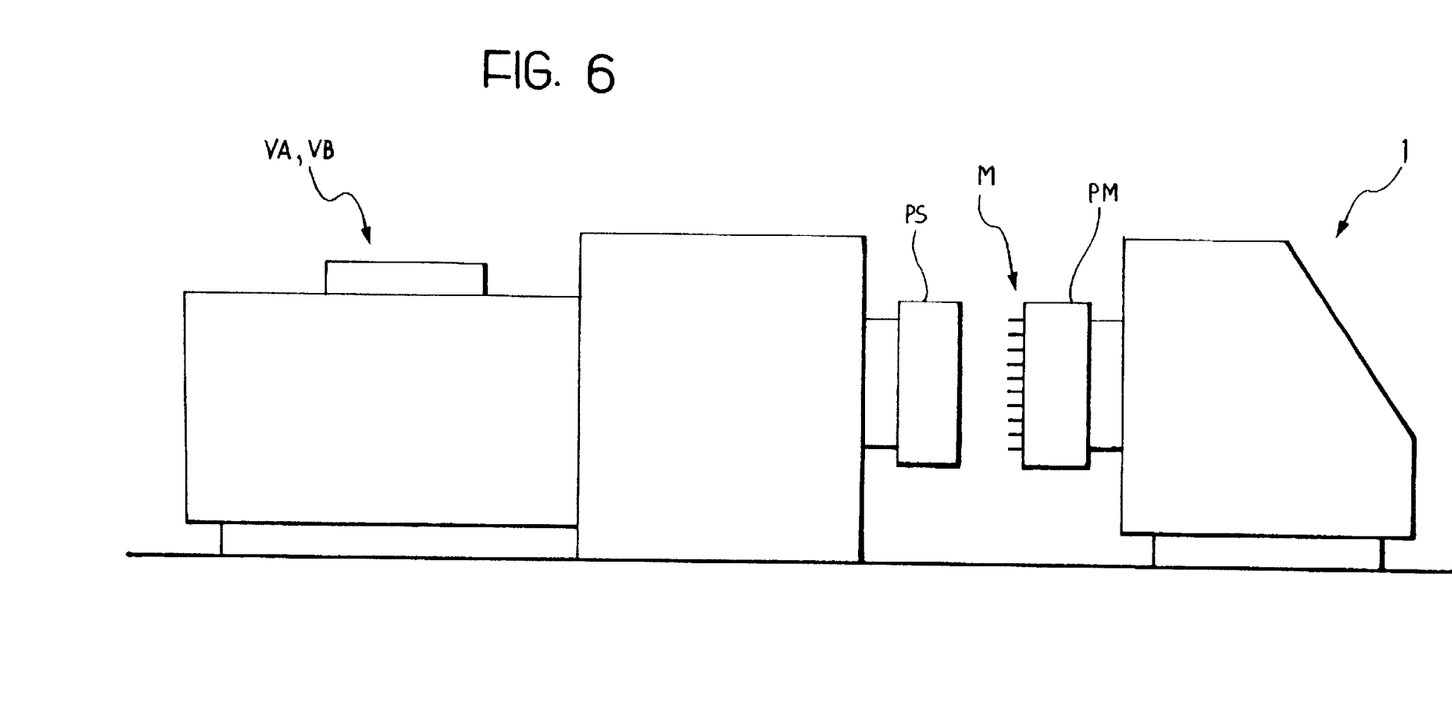
FIG. 6 is a schematic view of moulding equipment according to the present invention

FIG. 6 shows moulding equipment according to the invention, by way of example, schematically and not to scale. Naturally, the moulding equipment 1 has two plasticator units VA and VB for plasticating the virgin material A and the recycled material B, respectively. The structure of the equipment 1, however, is quite similar to the structure of conventional moulding equipment. In fact, it comprises a plate PS carrying the matrices and a plate PM carrying the male elements M, the plates, of course, being provided with all the conditioning provided for in this type of equipment (heating, cooling, etc.).

The two plates PS and PM are not, however, provided with a system for permitting additional or supplementary movement, rotation or translation in comparison with equipment of the prior art. The differences in comparison with the prior art in fact lie essentially in the structure and the configuration of the two plates PS and PM.

More specifically, in the equipment I according to the present invention, the plate PS carrying the matrices has matrices of two types, a first type defining a cavity corresponding to the external surface of the first portion F1 and a second type defining a cavity corresponding to the outer surface of the second portion F2, that is, of the finished parison F. These two types of matrices are present in equal numbers on the plate PS and are arranged alternately so that, for each pair of matrices defining a cavity of the first type F1, there is an adjacent pair of matrices defining a cavity of the second type F2. This situation can be seen, for example, in FIG. 7, in which it can be seen that, adjacent (beneath) a pair of matrices of the first type S1 defining a cavity of the first type F1, there is a pair of matrices of the second type S2 defining a cavity of the second type F2.

Figure 7:
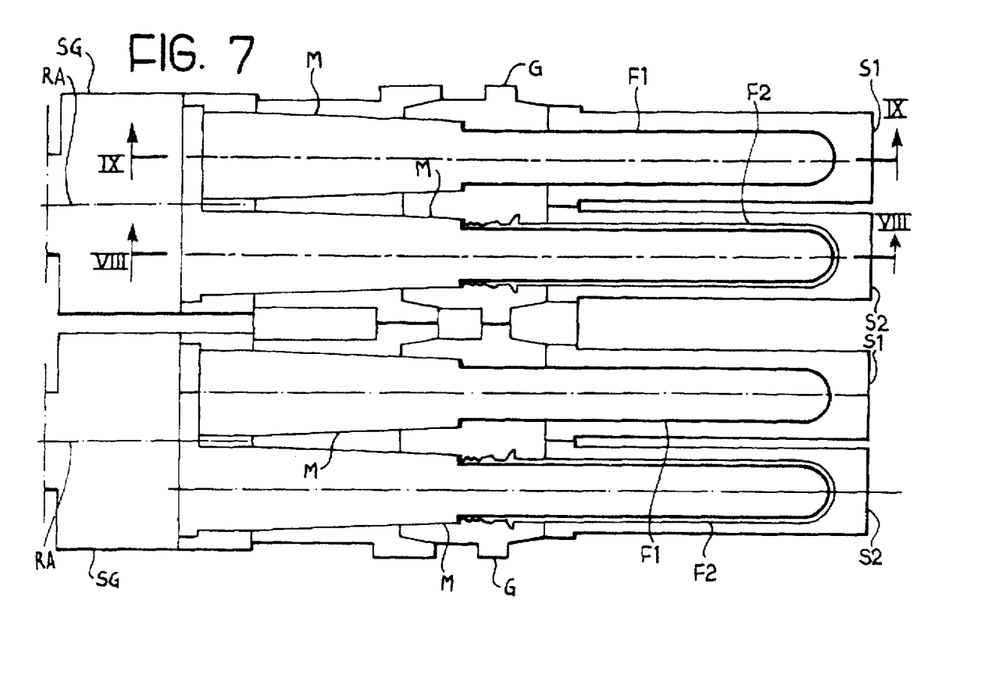
FIG. 7 is a schematic view, in section, of a portion of the equipment of FIG. 6.

Naturally, the pairs of matrices of the two types S1 and S2 are carried by the plate PS carrying the matrices. The pairs of matrices of the first type S1 are supplied, through a first set of supply ducts (not shown), with virgin plastics material A coming from the first plasticator unit VA of the equipment 1. The pairs of matrices of the second type S2, however, are supplied, through a second set of supply ducts (not shown), with recycled plastics material B coming from the second plasticator unit VB of the equipment 1.

This does not constitute an increase in the complexity of the equipment 1 in comparison with equipment according to the prior art since this equipment typically has two plasticator units because of the large volumes and fast production rates. The only small increase in complexity results from the need to use two sets of supply ducts disposed, for example, in two offset planes in the plate PS so as to keep separate the supplies to pairs of matrices (cheeks) of the two types S1 and S2.

The plate PM carrying the male elements M correspondingly has pairs of identical male elements M disposed in positions corresponding to those of the aforementioned alternating pairs of matrices of the first type Si and of the second type S2.

These pairs of male elements M, however, have the characteristic that they are disposed on rotatable supports SG. These rotatable supports SG are substantially cylindrical and can rotate about their own axes RA. Each rotatable support SG carries a pair of male elements M having axes which are parallel to each other and to the axis of rotation RA of the rotatable support SG, and are disposed in symmetrical and diametrally-opposed positions with respect to the axis of rotation RA. Clearly, therefore, a rotation of the rotatable support SG through 180° enables the two male elements M to be exchanged.

Figure 8:
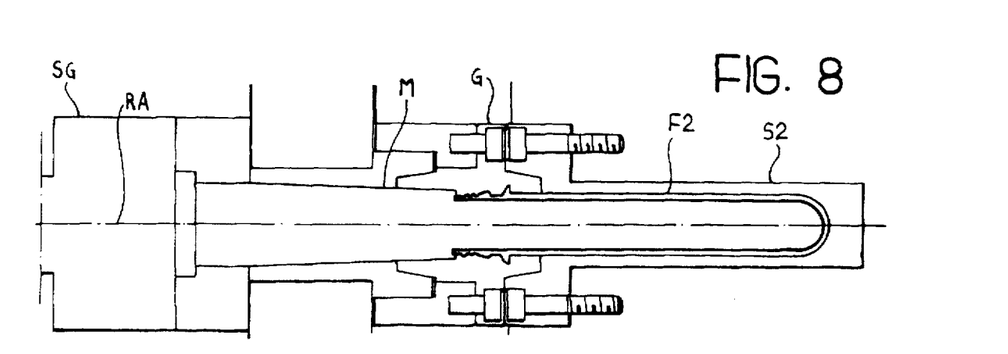
FIGS. 8 and 9 are two different schematic sectional views of the portion of the equipment shown in FIG. 7.
Figure 9:
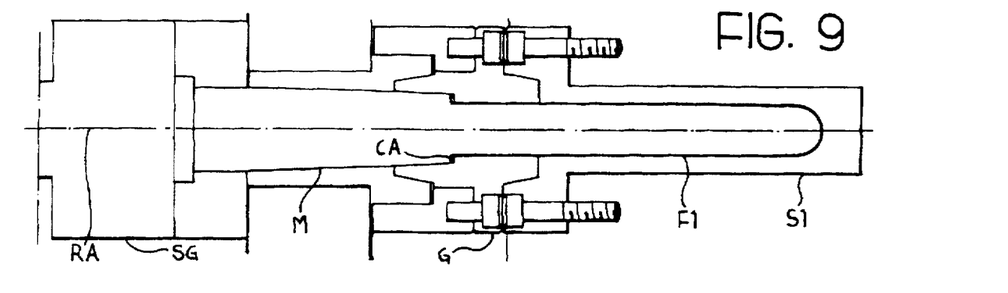

FIGS. 8 and 9 are two sections taken on the lines VIII—VIII and IX—IX of FIG. 7, which therefore provide a better understanding of the equipment 1 according to the invention.

As can be seen, in this case also, although the increased complexity of the plate PM of the die carrying the male elements M is more substantial, it is nevertheless limited. The specific embodiment described herein provides for these pairs of male elements M carried by rotatable supports SG to have cooling ducts (not shown).

Figure 10:
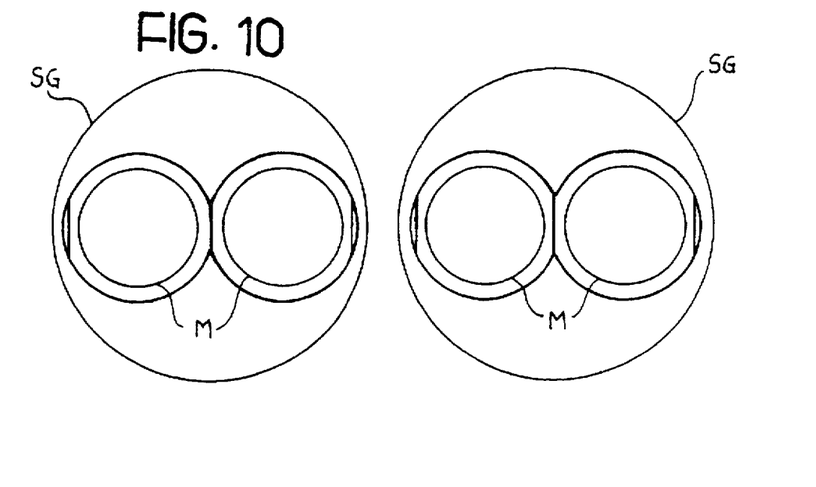
FIG. 10 is a schematic view of a component of the equipment of FIG. 6.

For a better understanding, FIG. 10 shows a pair of rotatable supports SG each carrying a pair of male elements M. Clearly, the rotation of the rotatable supports SG, which can be achieved by actuators of known type, causes the male elements M of each rotatable support SG to change places.

Figure 11:
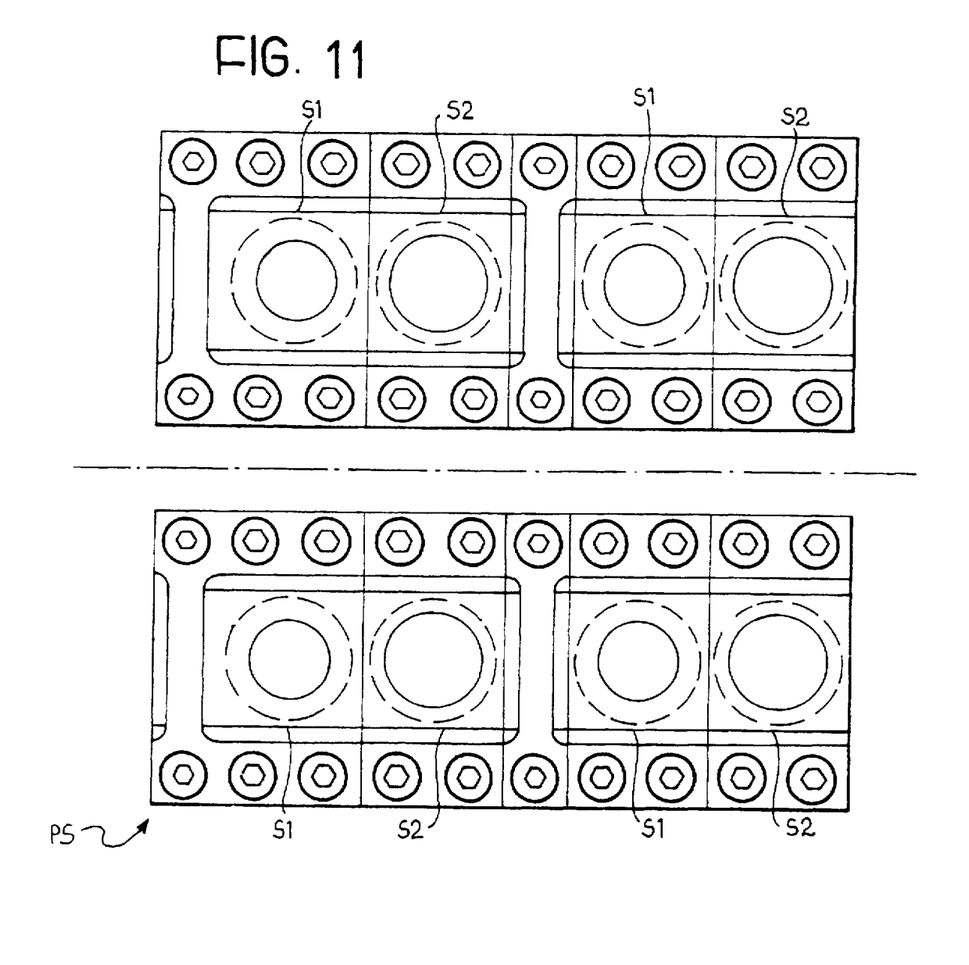
FIG. 11 is a schematic view of a further component of the equipment of FIG. 6.

FIG. 11 is a front view of a portion of a plate PS carrying the matrices of the first type Si and of the second type S2, in which it can be seen that they are disposed in an alternating configuration and, more specifically, in sets of two pairs of matrices, of different types, each set being in a position exactly corresponding to each pair of male elements M carried by the rotatable supports SG.

Figure 12:
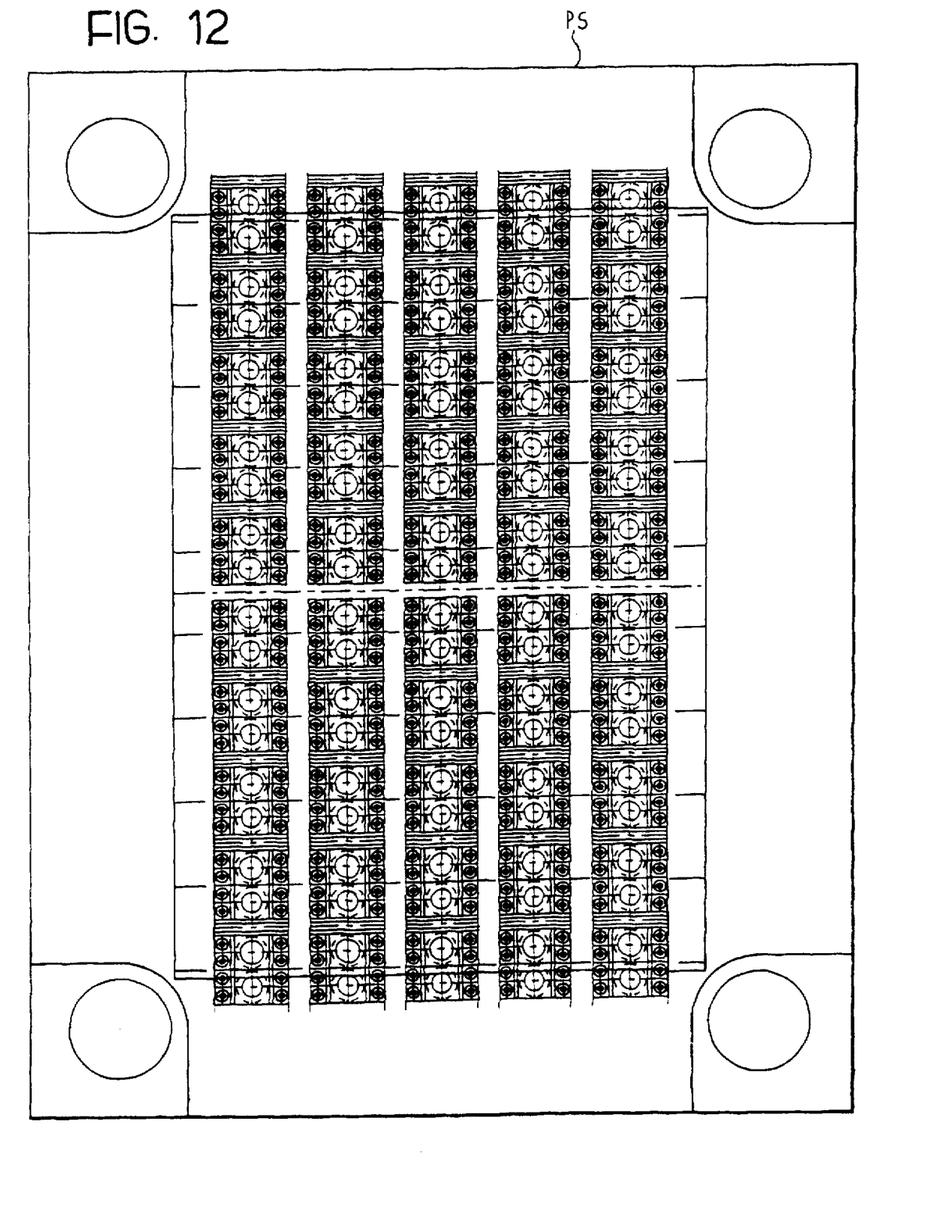
FIG. 12 is an overall view of the component shown in FIG. 11.

Finally, FIG. 12 shows a whole plate PS carrying 50 pairs of matrices of the first type SI and 50 pairs of matrices of the second type S2, thus forming a total of 50 sets of the type described. The corresponding plate PM carrying the male elements M (not shown) therefore has 50 rotatable supports SG disposed in a corresponding configuration.

A method which enables the parisons F of FIG. 5 to be produced is therefore clear, given equipment 1 according to the invention having the plates PS, PM just described.

In fact, the first portions F1 can be moulded in the pairs of matrices of the first type SI by means of a conventional moulding step. The matrices are then moved away and the rotatable supports SG are rotated through 180°, naturally without separating the first portions F1 from the male elements M, and these are then re-inserted in the matrices which are closed again. At this point, given the configuration just described, the male elements M carrying the first portions F1 which have just been moulded are inserted between the matrices of the second type S2. The second portions F2 can thus be moulded over the first portions F1 during the second moulding step, thus forming the desired parisons F.

Upon completion of the second moulding or overmoulding step, the finished parisons F can be removed and used to produce bottles by blowing.

Tests carried out by the Applicant have shown that the equipment I described herein and the corresponding method can achieve considerable efficiency in the production of parisons F which are composed of two different portions and are clearly more complex than parisons manufactured from a single material.

Equipment according to the prior art operates with cycles typically of the order of 20 seconds, that is, every 20 seconds it produces a number of parisons F corresponding to the number of cavities of the die used. The equipment 1 according to the present invention, on the other hand, can operate with two half cycles of about 15 seconds. That is, a moulding step is completed every 15 seconds by virtue of the fact that the cooling times are shorter since only one portion is moulded. The complete production cycle of a parison F thus lasts for about 30 seconds, a number of parisons F equal to half the number of cavities (or male elements M) of the matrix used being produced, in practice, every 15 seconds. This is also due to the fact that the rotation of the rotatable supports SG which enables the male elements M to change places is an operation which requires only about 0.2 seconds.

By contrast, if one were to succeed in producing moulding equipment in which the plates PS or PM were moved (translated or rotated), this operation would require a much longer time, probably of the order of 5 seconds, and would be highly penalizing economically.

For a better understanding, the method of manufacturing the parisons F will now be described with reference to FIGS. 13 to 17, which illustrate the main steps thereof.

Figure 13:
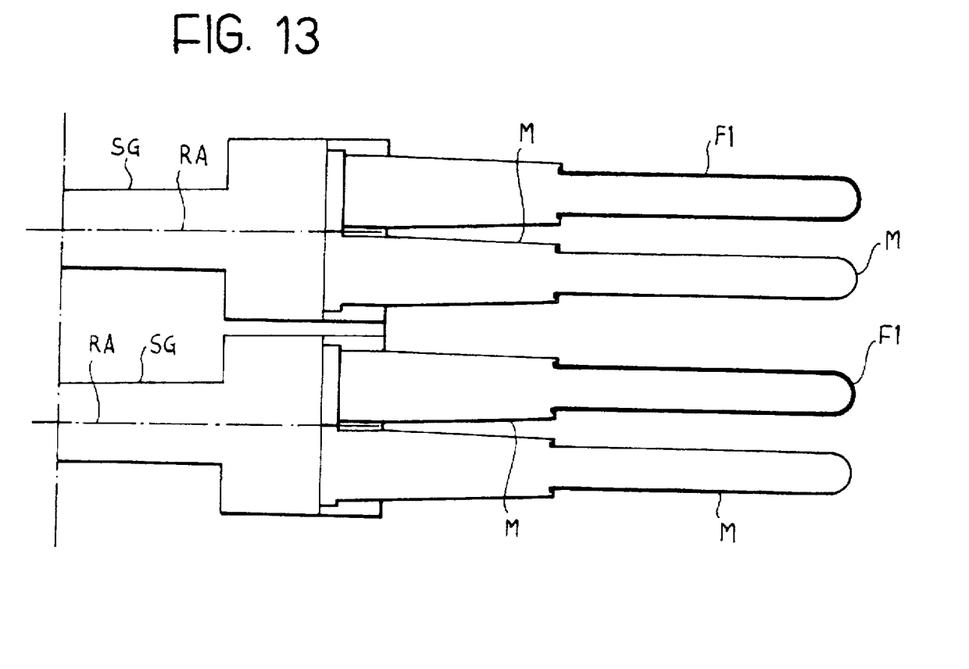
FIGS. 13–17 are schematic views of portions of the equipment of FIG. 6, showing its operation.

FIG. 13 shows a pair of rotatable supports SG each carrying a pair of male elements M. FIG. 13 relates to the end of the first moulding step in which the first portion F1 has been moulded on the male elements M which are in the upper positions in the drawing.

Figure 14:
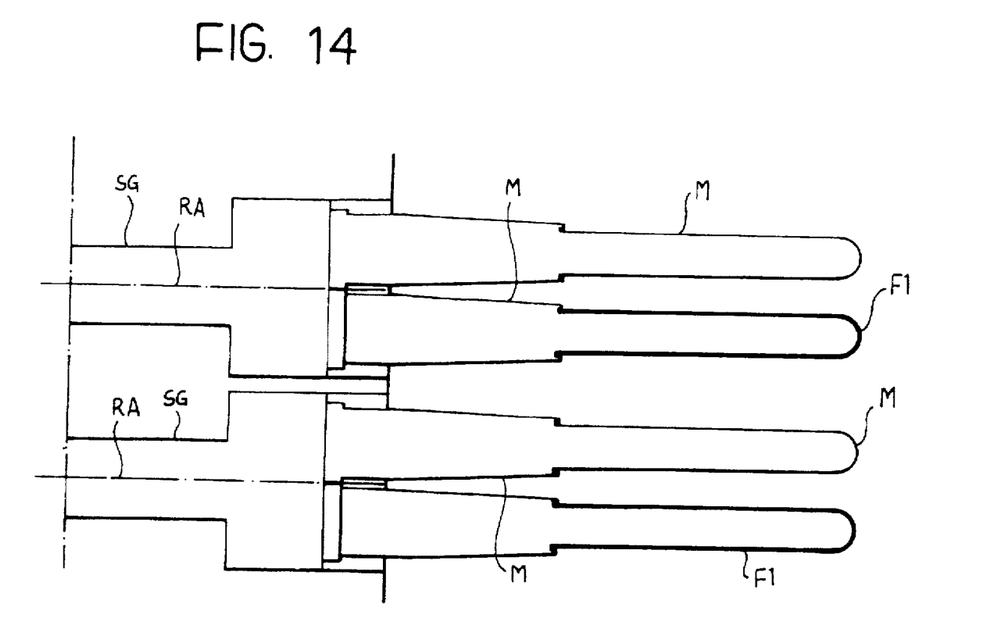

FIG. 14 shows the next stage in which it can be seen that the rotatable supports SG have been rotated through 180° about their axes of rotation RA. The male elements M carrying the first portions F1 have therefore changed places with the other male elements and are therefore now in the lower positions in the drawing.

Figure 15:
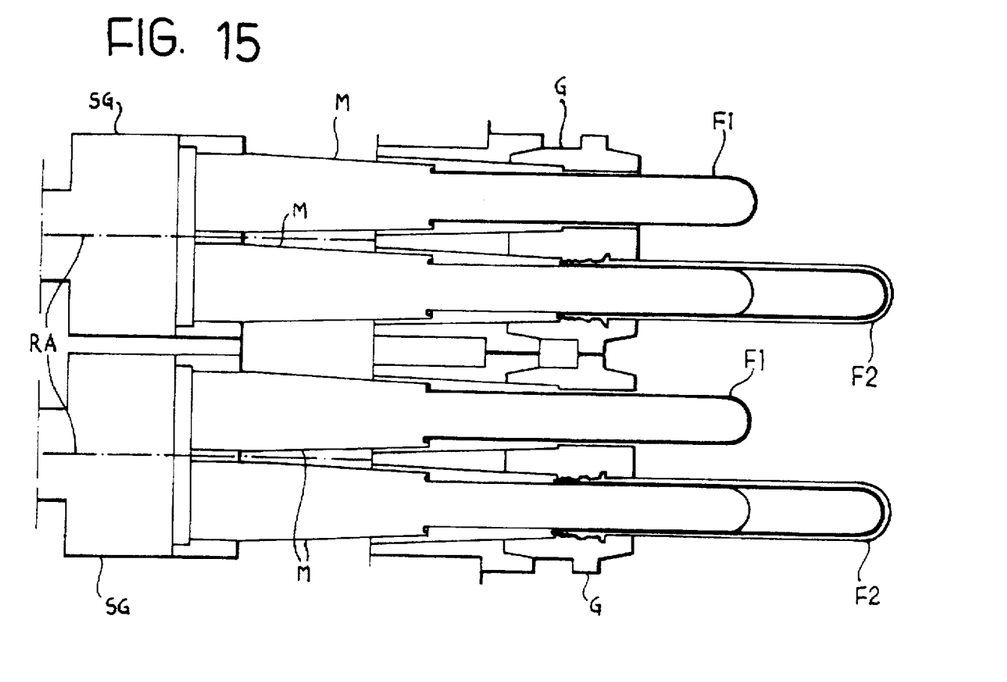

FIG. 15 shows the end of a second moulding step in which the second portion F2 has been moulded over the first portion F1.

In fact, the first portion F1 is moulded on each male element M when it is in the upper position. The male element M is then rotated to the lower position and the second portion F2 is moulded over it.

The end of this step is shown in FIG. 15. FIG. 15 also shows schematically the step of the removal of the finished parisons F2 which takes place essentially in conventional manner by means of an extractor device G used in a currently-preferred embodiment of the present invention, which will now be described.

In this specific embodiment, the matrices are actually formed slightly differently from those described up to now. In particular, the matrices comprise a further element G which corresponds to the opening or neck regions of the parisons F and also has the function of an extractor device. This element G is composed of two portions, sometimes called cheeks, which can be separated to allow the parisons F to be removed.

If an extractor element G of the type described is used, the remaining portions of the matrices S1 and S2 (visible, for example, in FIG. 16) can be formed in a single, inseparable piece, since the portions F1 or F2 can be removed therefrom simply by being pulled out. In order to facilitate this pulling out, the outer surfaces of the portions F1 and F2 may be slightly tapered. The extractor elements G are particularly advantageous in the removal operation shown in FIG. 15.

As can be seen, in this drawing, the matrix portions SI and S2 have already been moved away so that the portions F1 and F2 have been pulled out of them. Moreover, in FIG. 15, the male elements are shown moving away from the extractor elements G. As can be seen, during this operation, given the configuration of the male elements M and of the extractor elements G, the portion FL on the male element M in the upper position remains thereon and is then pulled out of the extractor element G corresponding to the matrix portion SI. Given the presence of the flange and the thread described above, the portion F2, however, remains locked in the extractor element G corresponding to the matrix portion S2 whilst the male element M in the lower position is pulled out of it.

Figure 16:
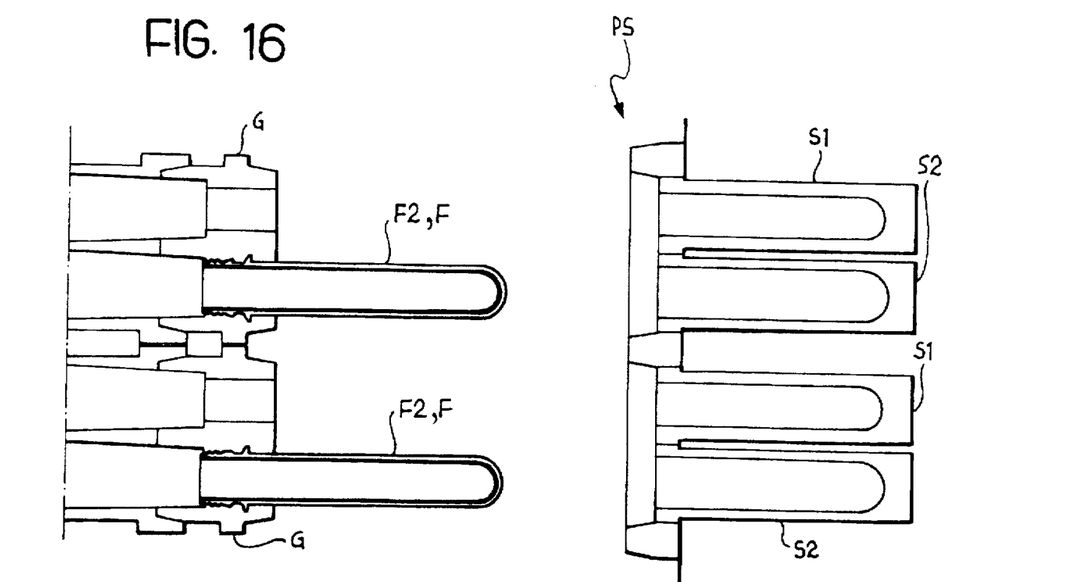

Upon completion of this operation, the situation is that shown in FIG. 16 in which, as can be seen, the portions FL which remain on the male elements M in the upper positions have been moved away whilst the portions F2 have been retained by the extractor elements G and have therefore been pulled off the male elements M in the lower positions.

FIG. 16 also shows a portion of the plate PS carrying two sets of matrix portions of the first type Si and of the second type S2. As already stated, the matrix portions of the first type Si are disposed in the upper positions, and the matrix portions of the second type S2 are in the lower positions.

Figure 17:
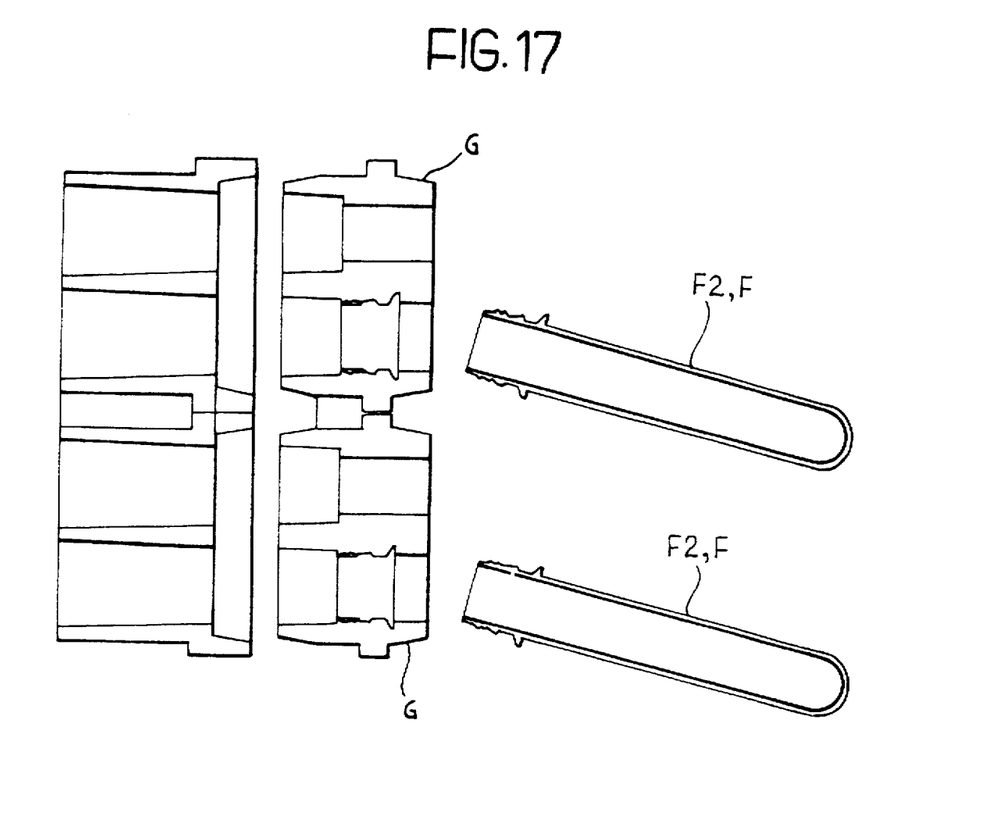

At this point, therefore, the extractor elements G can be separated to release the finished parisons F. This operation is shown in FIG. 17, which in fact shows the step of the expulsion of the finished parisons F from the extractor elements G.

Clearly, moreover, apart from the first moulding step when production starts, the steps of the moulding of the first portion FL and of the second portion F2 in the matrices of the two types S1 and S2 can take place simultaneously. Typically, therefore, in each moulding step, a first portion FL is moulded onto half of the male elements M whilst a second portion F2 is moulded onto the second half of the male elements M. The finished parisons F, that is, those having the second portion F2, are then removed and the pairs of male elements M are changed around so that in the next moulding step, the second portion F2 is moulded on the first set of male elements M whilst a first portion FL is moulded again on the second set of male elements M which has just completed the parisons F.

In operation, the production process thus enables moulding to be carried out in all of the cavities of the matrix for each operation, thus achieving extremely high productivity as is clear from the cycle times given above, with equipment, the cost and complexity of which are little greater than those of conventional equipment.

A currently-preferred embodiment provides for a substantially annular recess CA, indicated for simplicity only in FIG. 9, disposed at the base of the male element M. This annular recess CA is to compensate for the shrinkage which occurs after the moulding of the first portion FL. Moreover, it achieves a better seal between the extractor device G and the male element M during the moulding of the second portion F2.

An alternative embodiment of the equipment I according to the present invention, using the same principle, can also be produced. For example, equipment 1 having identical sets of matrices or pairs of matrices can be produced. The male elements M carried by the rotatable supports SG, on the other hand, have different shapes; in particular, a first male element M has a shape such as to define the internal surface of the second portion F2, whereas a second male element M has a shape such as to define the internal surface of the first portion FL.

With equipment of this type, it is therefore possible to could the second portion F2, to remove the corresponding male element M, leaving the second portion F2 in the matrix, to turn the male element M round, and then to could the first portion FL inside the second portion F2. In practice, the order of the moulding steps is reversed, since the outer portion F2 is moulded first and the inner portion FL is then moulded inside it. If the plastics material is injected from the matrix side, naturally it is necessary to provide a hole in the outer portion F2 to allow the plastics material required for the moulding of the inner portion F1 to pass through and it is advantageous, in order to make the production cycle more efficient, to use rotatable supports SG carrying four male elements M of the two types for each set of matrices defining two cavities.

It can be seen from the foregoing that the present invention is suitable for many applications and can thus be used not only for the moulding of containers F but, more generally, for the moulding of components of plastics material comprising at least a first portion of a first plastics material and a second portion of a second, different plastics material.

Naturally, the principle of the invention remaining the same, the details of construction and forms of embodiment may be varied widely with respect to those described and illustrated, without thereby departing from the scope of the present invention.

What is claimed is:

1. Equipment for injection-moulding of articles of plastics material, each article comprising a first portion of a first plastics material and a second portion of a second plastics material, the equipment comprising:

first and second die means defining first and second surfaces of the article, respectively, first and second support means supporting said first and second die means respectively, and the first and second die means being capable of being coupled in order to could the article, wherein the second die means comprise a plurality of pairs of concave die portions, each pair including a first concave die portion and a second concave die portion which are supported in respective fixed relative positions on a plurality of said second support means, said plurality of second support means being mounted on a first common plate adjacent each other, and the first support means comprise a plurality of movable supports corresponding to said plurality of second support means respectively for causing the first die means to adopt at least first and second predetermined operative positions, in which the first die means are coupled with the first concave die portion and with the second concave die portion of the second die means, respectively, the first portion of the second die means defining, when coupled with the first die means, a first cavity for the moulding of the first portion of the article, and the second portion of the second die means defining, when coupled with the first die means and the first moulded portion of the article, a second cavity for the moulding of the second portion of the article, said plurality of movable supports being mounted on a second common plate adjacent each other in alignment with said plurality of second support means.

2. Equipment according to claim 1, wherein the article is a container, the first die means are convex die means, the first portion of the second die means comprises first concave die means, the second portion of the second die means comprises second concave die means, the convex die means, when coupled with the first concave die means, defining a first cavity for moulding the first, inner portion of the container, and the convex die means carrying the first internal portion, when coupled with the second concave die means, defining a second cavity for the moulding of the second, outer portion of the container.

3. Equipment according to claim 1, wherein the article is a container, the first die means are concave die means, the first portion of the second die means comprises first convex die means, the second portion of the second die means comprises second convex die means, the concave die means, when coupled with the first convex die means, defining a first cavity for moulding a first, outer portion of the container, and the concave die means, carrying the first, outer portion, when coupled with the second convex die means, defining a second cavity for the moulding of a second, inner portion of the container.

4. Equipment according to claim 2, wherein each movable support carries at least one convex die means movable between the first and second predetermined operative positions.

5. Equipment according to claim 4, wherein each movable support is a rotatable support which can rotate about a rotation axis so as to cause the at least one convex die means to move between the first and second predetermined operative positions.

6. Equipment according to claim 5, wherein each rotatable support comprises two convex die means disposed in a manner such that when a first of the two convex die means is in the first predetermined operative position, a second of the two convex die means is in the second predetermined operative position, and vice versa.

7. Equipment according to claim 6, wherein the two convex die means are disposed on the rotatable support in diametrally opposed positions with respect to the axis of rotation, and in that the rotatable support is rotated through 180° so as to cause the two convex die means to adopt the first and second predetermined operative positions.

8. Equipment according to claim 4, comprising first and second plasticator means, wherein the first concave die means are supplied with the first plastics material, through first supply means, by the first plasticator means and the second concave die means are supplied with the second plastics material, through second supply means, by the second plasticator means.

9. Equipment according to claim 4, wherein the plurality of movable supports comprises a plurality of rotatable supports and the second support means comprise a corresponding plurality of the first and second concave die means.

10. Equipment according to claim 9, wherein the first support means comprise a first plate carrying the rotatable supports carrying the convex die means and the second support means comprise a second plate carrying the concave die means defining the cavities corresponding to the first and second portions.

11. Equipment according to claim 10, wherein the first and second concave die means comprise first and second matrices.

12. Equipment according to claim 11, wherein the first and second matrices comprise extractor means for enabling the first portion and the container to be removed from the matrices.

13. Equipment according to claim 12, wherein the extractor means comprise two separable portions for allowing the container to be expelled.

14. Equipment according to claim 13, being configured in a manner such as to permit simultaneous moulding of the first and second portions in the first and second matrices.

15. Equipment according to claim 14, wherein the first and second supply means in the second plate are two sets of ducts for supplying the first and second plastics materials, the two sets of ducts being disposed in two offset planes in the second plate.

16. Equipment according to claim 15, wherein the convex die means comprise ducts for the circulation of a cooling fluid.

17. Equipment according to claim 16, wherein the second plate and the matrices comprise heating means for keeping them at a temperature suitable for moulding.

18. Equipment according to claim 4, wherein the containers are parisons used for the manufacture of bottles of a plastics material by blowing, being configured for moulding a first inner portion of very pure plastics material and a second, outer portion of recycled plastics material.

19. Equipment according to claim 18, wherein the very pure plastics material is new polyethylene terephthalate and the recycled plastics material is recycled polyethylene terephthalate.

* * * * *